E. ALBRIGHT.
PAN RACK.
APPLICATION FILED AUG. 2, 1916.
1,272,175.
Patented July 9, 1918.
2 SHEETS—SHEET 2.
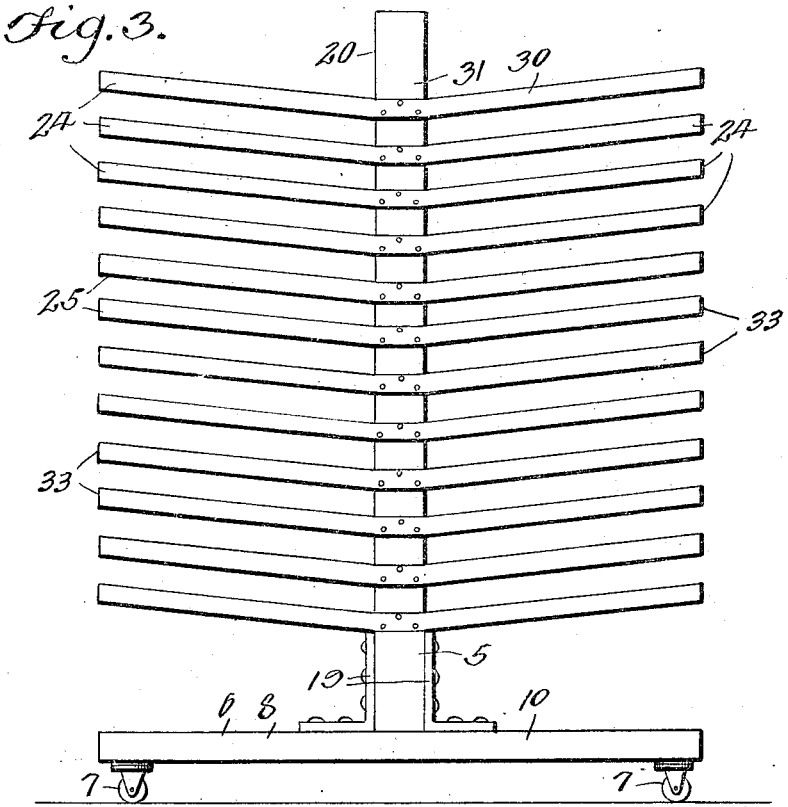
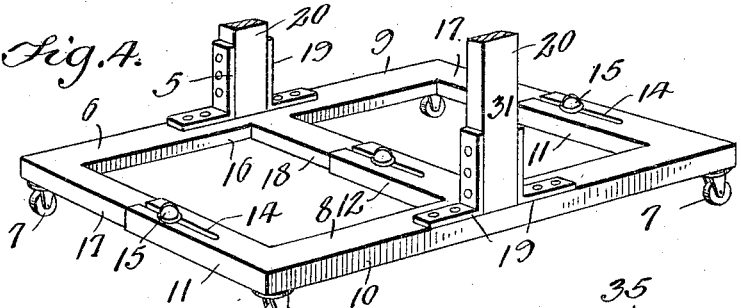
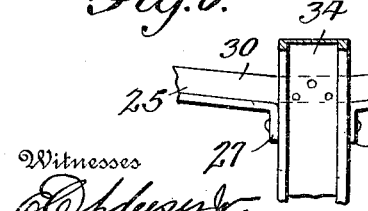
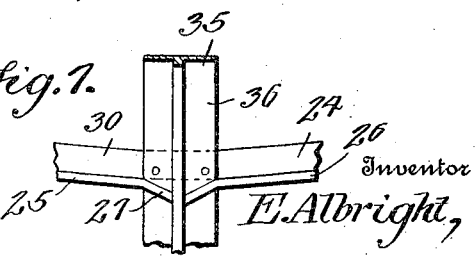
Witnesses
Inventor
E. Albright,
By Victor J. Evans
Attorney

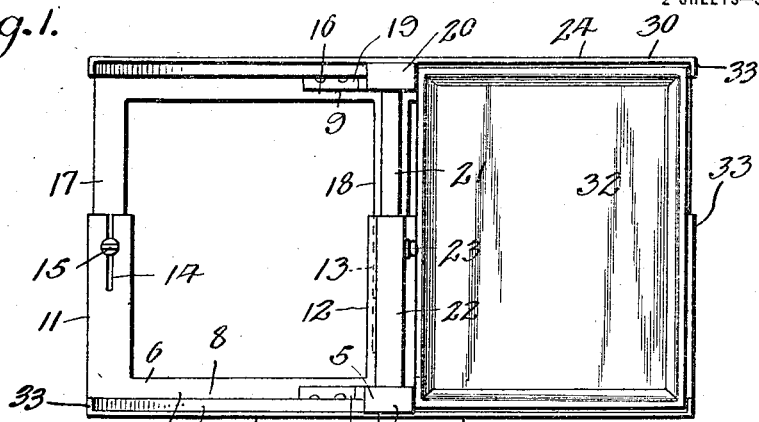
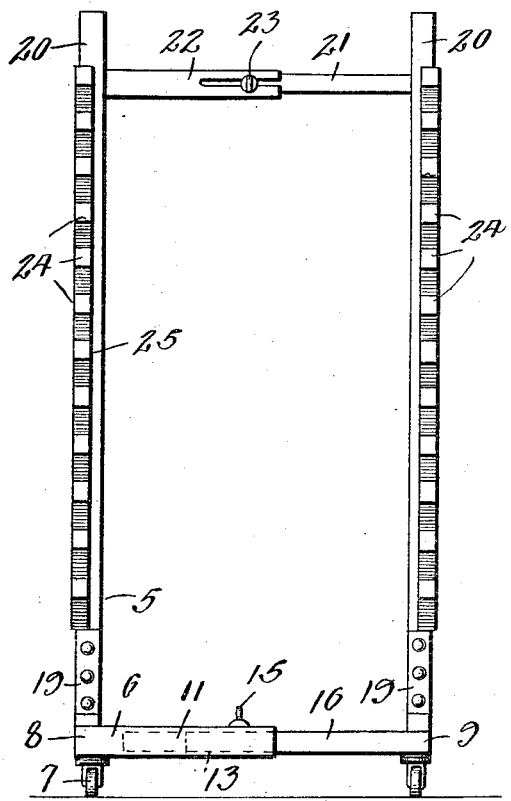
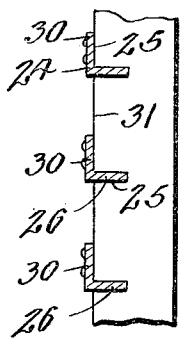

UNITED STATES PATENT OFFICE.

EDWARD ALBRIGHT, OF MENOMINEE, MICHIGAN.

PAN-RACK.

1,272,175.

Specification of Letters Patent.

Patented July 9, 1918.

Application filed August 2, 1916. Serial No. 112,825.

*To all whom it may concern:*

Be it known that I, EDWARD ALBRIGHT, a citizen of the United States, residing at Menominee, in the county of Menominee and State of Michigan, have invented new and useful Improvements in Pan-Racks, of which the following is a specification.

This invention relates to improvements in racks, and more particularly to that class thereunder known as portable pan racks, primarily adapted for use in supporting and conveying pans to and from the ovens either in a filled or emptied condition.

The primary object of the invention is the provision of a device of the above stated character which may be simple in construction, durable in use, well adapted for the purposes intended, and wherein means are employed for adjusting the support for the racks to accommodate pans of various sizes.

A further object of the invention is the provision of shelves having connection with the uprights in a novel manner, and so constructed, whereby when the pans are mounted upon the shelves to prevent any accidental displacement of the same from such shelves, during the transportation of the pans.

To this end, use is made of a series of shelves constructed of angle irons, adaptable for supporting a series of pans, the said shelves inclining downwardly in a direction toward the upright or post to which the same is affixed, thus preventing any accidental slipping or displacement of the pans from the racks during the transportation of the wheeled base upon which the shelves are supported, over the floors.

With the above and other objects in view, the invention consists in the novel features, details of construction and combination of parts which will hereinafter be more fully set forth, illustrated in the accompanying drawing and pointed out in the appended claims.

Figure 1 is a top plan view of the pan rack constructed in accordance with my invention;

Fig. 2 is an end elevation;

Fig. 3 is a side view;

Fig. 4 is a perspective view of the wheeled support showing the pan shelves removed therefrom;

Fig. 5 is a detail view showing the manner of connection of the pan shelves with a wooden upright or post of the wheeled support;

Fig. 6 is a detail view, showing a slightly modified form, illustrating the manner of connection of the pan shelves with a channeled iron upright or post; and Fig. 7 is a detail view illustrating a further modified form, showing the manner of connection of the pan shelves with a T-bar upright or post.

Referring more particularly to the accompanying drawing, reference being had to Figs. 1 to 5 inclusive, 5 denotes the rack generally, comprising a wheeled base 6 supported upon casters 7. The said base embodies a pair of sections 8 and 9 respectively, and preferably constructed from metal or the like material. The section 8 of the base is formed with a side rail 10 provided at its opposite ends with inwardly and angularly extending end rails 11 and provided at a point intermediate of its length with an inwardly and angularly extending intermediate rail 12. The respective end and intermediate rails of the section 8 are of hollow formation, providing the same with sockets 13, and each of said rails is further provided in the top surface thereof with an elongated slot 14. Located in the slots or openings 14 of the said intermediate and end rails is a locking screw 15. The opposite or other section 9 of the wheeled base 6 embodies a side rail 16 formed at the opposite ends thereof with solid end rails 17 and an intermediate inwardly extending slitted rail 18. The said end and intermediate rails of the section 9 are telescopically mounted within the sockets 13 of the respective end and intermediate rails of the section 8, thus adapting the wheeled base for adjustment to accommodate pans of different sizes. The sections are retained in locked engagement through the medium of the locking screws 15. Fixedly secured on the side rails 10 and 16 of the respective sections 8 and 9 of the wheeled base by means of clamps 19 are spaced parallel upstanding posts or uprights 20, which in the form shown in Figs. 1 to 5 inclusive, are preferably constructed of wood. The upper ends of these uprights 20 are adjustably connected together through the medium of the inwardly extending bar 21 fixed to one of the uprights or posts 20, telescopically mounted in the hollow bar 22 carried by the opposite upright or post 20. The bars 21 and 22 of the uprights are adjustably connected together through the employment of the lock screw 23, thereby preventing any undue spreading of the bars when subjected to the weight of the pans.

I employ in connection with a wheeled support or rack of the above stated character a plurality of shelves 24. These shelves are constructed of angle irons 25 and are secured to the outer side faces of the respective uprights or posts 20, in spaced superposed relation one to the other, and the shelves 24 secured to one of the uprights are in alinement with the shelves 25 secured to the opposite upright, thus when the shelves are in assembled position, will serve to support a series of pans, preferably bakers' pans. To this end, the said shelves are arranged in a longitudinal plane with respect to the wheeled base 6 and have their horizontal portions 26, at a point intermediate the length of the shelves, cut out to provide depending flanges 27, embedded in the outermost side faces of the uprights or posts 20 and the vertical portion 30 of the angle iron is riveted to the outermost face 31 of the upright. By this arrangement, the shelves 25 will be permanently connected in spaced bars to the opposite posts or uprights 20. Each of the shelves 25 are inclined in a downward direction toward the uprights 26, thus providing the shelves of such configuration to prevent any accidental sliding or displacement of the pans 32 from the angle iron shelves 25. As better shown in Figs. 1 and 3 of the drawings, each of the end shelves is provided with off-bent end flanges 33 which facilitate the retention of the pans on said shelves. Furthermore, the distance which the shelves 30 protrude from opposite sides of the uprights, permits of a plurality of pans to be supported on the shelves at opposite sides of said uprights.

In the modified form shown in Fig. 6 of the drawing, the uprights or posts 34 are constructed of channel iron, and the vertical portion 30 of the shelves, as well as the depending flanges 27 thereof are riveted to the respective connecting and side portions of the channeled arms.

Shown in Fig. 7 of the drawing is a still further modified form, illustrating the uprights 35 comprising T-bars. In this form, the upstanding portions 30 of each of the shelves are riveted to the head 36 of the bar, and the depending flanges 27 are brought to bear against the under surface of the head 36.

It is to be understood that the uprights 34 and 35 shown in the modified forms of the invention are connected with the wheeled base and to one another in the identical manner as that described in the preferred embodiment of the invention; in view thereof, a further explanation of the manner of connecting the uprights with the wheeled base and the connection of the respective uprights to one another is believed to be unnecessary.

From the foregoing description, taken in connection with the accompanying drawing, the advantages of construction and of the method of operation will be readily apparent to those skilled in the art to which the invention relates, and while I have described the principles of operation of the invention, together with the device which I now consider to be the best embodiment thereof, I desire to have it understood that the device shown is merely illustrative, and that such changes may be made when desired as are within the scope of the claims appended thereto.

I claim:—

1. In a device of the class described, a wheeled base comprising a pair of adjustable telescopically mounted sections, means for locking said sections against movement, a pair of spaced uprights connected with and medially of said base, a telescopic cross bar adjustably connecting the upper ends of the uprights to permit the adjustment thereof upon the adjustment of the base, and a series of pan supporting members connected with the exterior side faces of said uprights and capable of supporting pans of various lengths.

2. In a device of the class described, a wheeled base having an adjustable connection at the end and intermediate portions thereof, a pair of spaced uprights connected with said base at opposite sides of its intermediate connection, a telescopic cross bar for spreading apart or drawing together the upper ends of the uprights, and a series of pan supporting members of L-shaped configuration in cross section having their vertical and horizontal portions engaging with said uprights for connecting the supporting members therewith and disposing the latter in a longitudinal plane with respect to said base.

In testimony whereof I affix my signature.

EDWARD ALBRIGHT.

Copies of this patent may be obtained for five cents each, by addressing the "Commissioner of Patents, Washington, D. C."